(12) United States Patent
Matsuzaki et al.

(10) Patent No.: US 10,939,605 B2
(45) Date of Patent: Mar. 9, 2021

(54) CONTROLLER FOR WORK MACHINE, CONTROL METHOD FOR WORK MACHINE, AND WORK MACHINE

(71) Applicant: Kubota Corporation, Osaka (JP)

(72) Inventors: Yushi Matsuzaki, Sakai (JP); Atsushi Shinkai, Sakai (JP); Kazunobu Sugano, Sakai (JP); Kotaro Yamaguchi, Amagasaki (JP); Takafumi Morishita, Amagasaki (JP); Kenji Tamatani, Amagasaki (JP); Hiroki Suga, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 214 days.

(21) Appl. No.: 15/985,706

(22) Filed: May 22, 2018

(65) Prior Publication Data

US 2018/0338407 A1    Nov. 29, 2018

(30) Foreign Application Priority Data

May 26, 2017 (JP) .............................. JP2017-104311

(51) Int. Cl.
*A01B 69/04* (2006.01)
*B62D 15/02* (2006.01)
(Continued)

(52) U.S. Cl.
CPC .............. *A01B 69/008* (2013.01); *B60T 7/18* (2013.01); *B60T 8/17* (2013.01); *B60T 8/246* (2013.01);
(Continued)

(58) Field of Classification Search
CPC .. A01B 69/00; A01D 75/28; B60G 2800/965; B60W 30/04
See application file for complete search history.

(56) References Cited

U.S. PATENT DOCUMENTS 6,059,383 A   5/2000  Paggi et al.
6,109,384 A * 8/2000  Bromley ................. B60K 6/08
                                                180/242
(Continued)

FOREIGN PATENT DOCUMENTS

DE    69729173 T2    5/2005
EP     3115332       1/2017
(Continued)

OTHER PUBLICATIONS

European Patent Office Communication for corresponding EP Application No. 18173558.0-1013, dated Sep. 25, 2019.
(Continued)

*Primary Examiner* — Ryan Rink
(74) *Attorney, Agent, or Firm* — Mori & Ward, LLP

(57) ABSTRACT

A controller for a work machine includes a steering control circuit, a memory, and a speed control circuit. The steering control circuit is configured to control a steering of the work machine to change a steering angle based on a travel route. The memory is to store a threshold angle. The speed control circuit is configured to control a speed of the work machine if the steering angle is equal to or larger than the threshold angle and if the steering control circuit does not control the steering.

14 Claims, 6 Drawing Sheets

(51) Int. Cl.
  *B60T 7/18* (2006.01)
  *B60T 8/17* (2006.01)
  *B60T 8/24* (2006.01)

(52) U.S. Cl.
  CPC ....... *B60T 2201/08* (2013.01); *B60T 2201/16* (2013.01); *B60T 2260/02* (2013.01); *B62D 15/021* (2013.01); *B62D 15/025* (2013.01)

(56) References Cited

U.S. PATENT DOCUMENTS

| | | | | |
|---|---|---|---|---|
| 6,112,842 | A * | 9/2000 | Ura | B60K 17/348 172/2 |
| 6,320,497 | B1 * | 11/2001 | Fukumoto | B60K 35/00 340/425.5 |
| 2004/0074686 | A1 * | 4/2004 | Abend | F16H 61/456 180/242 |
| 2004/0199320 | A1 * | 10/2004 | Harada | B60K 23/08 701/69 |
| 2005/0085985 | A1 * | 4/2005 | Suzuki | B60T 8/1755 701/70 |
| 2009/0069967 | A1 * | 3/2009 | Reed | B62D 1/286 701/23 |
| 2011/0022267 | A1 | 1/2011 | Murphy | |
| 2012/0247846 | A1 * | 10/2012 | Ichikawa | B60H 1/00564 180/65.21 |
| 2015/0210291 | A1 * | 7/2015 | Hutten-Czapski | B60W 50/0098 701/1 |
| 2018/0065604 | A1 * | 3/2018 | Matsuno | B60T 8/1755 |
| 2019/0308611 | A1 * | 10/2019 | Lee | B60G 21/0558 |
| 2020/0341461 | A1 * | 10/2020 | Yokoyama | B60W 60/0015 |

FOREIGN PATENT DOCUMENTS

| | | |
|---|---|---|
| JP | 10-029553 | 2/1998 |
| JP | 2005-013243 | 1/2005 |
| JP | 2008-057391 | 3/2008 |
| JP | 2008-278839 | 11/2008 |
| JP | 2016-155491 | 9/2016 |
| WO | WO 2009/032030 | 3/2009 |

OTHER PUBLICATIONS

Extended European Search Report for corresponding EP Application No. 18173558.0-1013, dated Oct. 9, 2018.
Japanese Office Action for corresponding JP Application No. 2017-104311, dated Jul. 9, 2020 (w/ machine translation).

* cited by examiner

CONTROLLER FOR WORK MACHINE, CONTROL METHOD FOR WORK MACHINE, AND WORK MACHINE

CROSS-REFERENCE TO RELATED APPLICATIONS

The present application claims priority under 35 U.S.C. § 119 to Japanese Patent Application No. 2017-104311, filed May 26, 2017. The contents of this application are incorporated herein by reference in their entirety.

BACKGROUND OF THE INVENTION

Field of the Invention

The present invention relates to, for example, a controller for a work machine, a control method for a work machine, and a work machine.

Discussion of the Background

Such a conventional technique described in JP 2005-13243 A is known that controls a speed, for example, of a work machine when the work machine makes a turn. Such a technique described in JP 2016-155491 A is also known that controls a travel route for a work machine.

The work machine described in JP 2005-13243 A includes a front wheel transmission and a side brake. The front wheel transmission is configured to switch between a standard state at which front wheels and rear wheels are respectively driven at approximately identical speeds and an acceleration state at which the front wheels are driven at a higher speed than a speed of the rear wheels. The side brake is configured to independently brake the rear wheels. The work machine described in JP 2016-155491 A includes a position deviation computing unit, a first control computing unit, and a steering drive unit. The position deviation computing unit is configured to compute a position deviation between an own vehicle position and a target travel route. The first control computing unit is configured to output a first steering value that cancels the deviation, based on the position deviation. The steering drive unit is steered based on the first steering value.

SUMMARY OF THE INVENTION

According to one aspect of the present invention, a controller for a work machine includes a steering control circuit, a memory, and a speed control circuit. The steering control circuit is configured to control a steering of the work machine to change a steering angle based on a travel route. The memory is to store a threshold angle. The speed control circuit is configured to control a speed of the work machine if the steering angle is equal to or larger than the threshold angle and if the steering control circuit does not control the steering.

According to another aspect of the present invention, a work machine includes a vehicle body, a steering, front wheels, rear wheels, a steering control circuit, a memory, and a speed control circuit. The steering is configured to change a direction of the vehicle body. The front wheels are rotatably supported by the vehicle body. The rear wheels are rotatably supported by the vehicle body. The steering control circuit is configured to control the steering to change a steering angle based on a travel route. The memory is to store a threshold angle. The speed control circuit is configured to control a speed of the work machine if the steering angle is equal to or larger than the threshold angle and if the steering control circuit does not control the steering.

According to a further aspect of the present invention, a control method for a work machine, includes controlling a steering of the work machine to change a steering angle based on a travel route, storing a threshold angle in a memory, and controlling a speed of the work machine if the steering angle is equal to larger than the threshold angle and if the steering is not controlled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
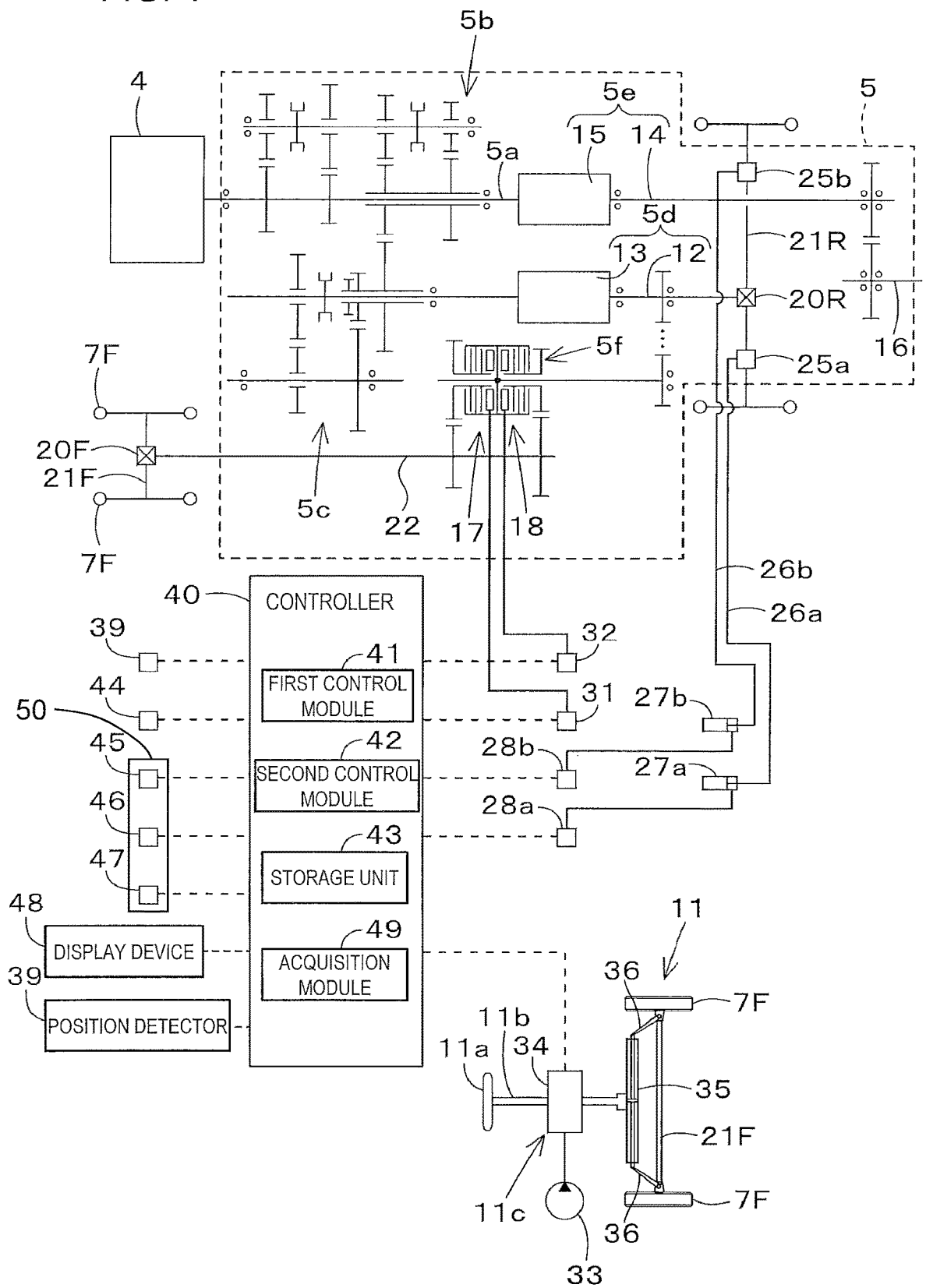
FIG. 1 is a configuration and control block diagram of a work machine.

The embodiments will now be described with reference to the accompanying drawings, wherein like reference numerals designate corresponding or identical elements throughout the various drawings.

An embodiment of the present invention will be described below based on the drawings.

First Embodiment

FIG. 1 is a control block diagram of a work machine. The work machine is an agricultural machine, such as a tractor, a combine, or a rice transplanting machine. Here describes a tractor as the work machine.

Figure 6:
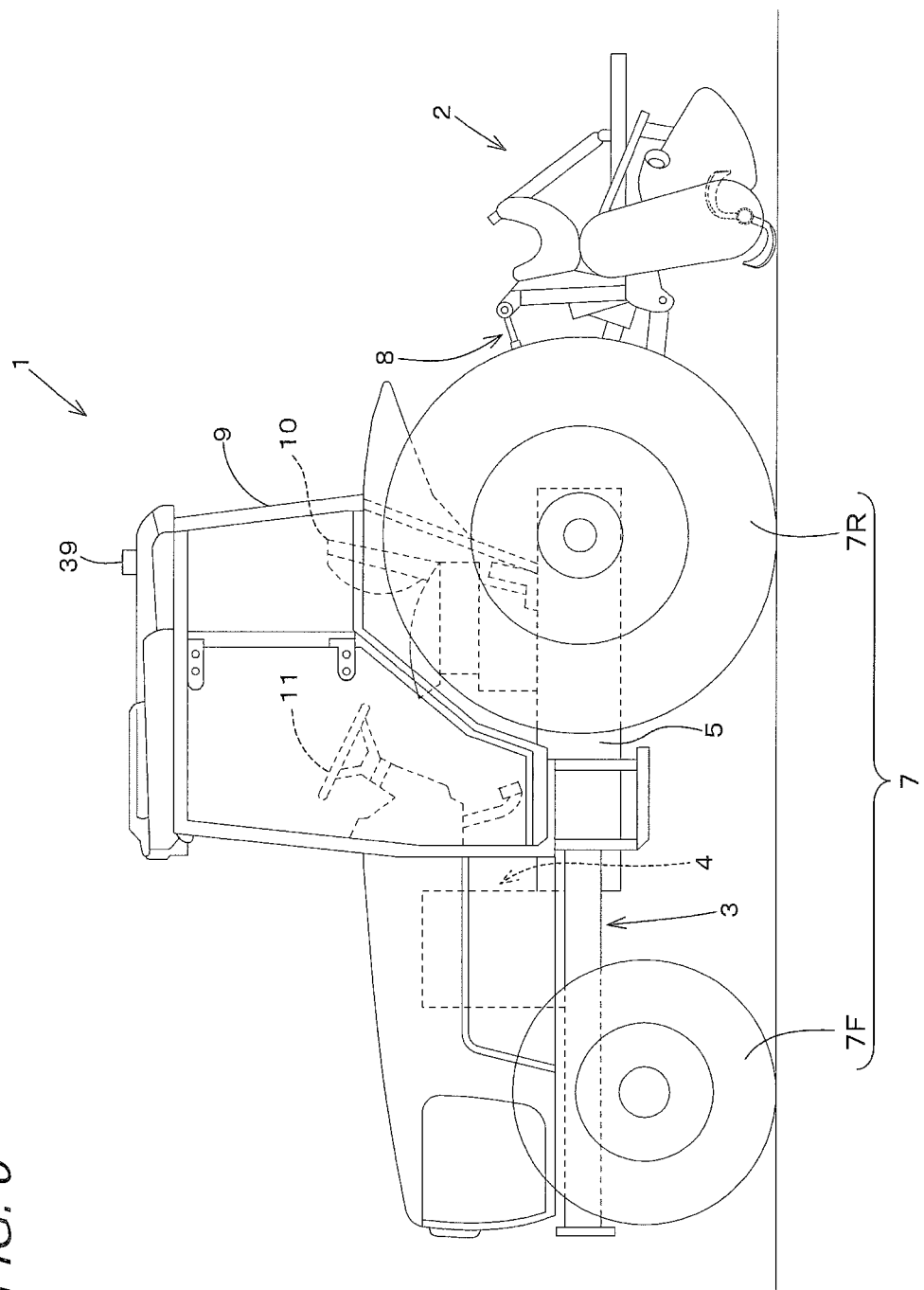
FIG. 6 is a general view of the tractor.

As illustrated in FIG. 6, a tractor 1 includes a vehicle (vehicle body) 3, a motor 4, and a transmission 5. The vehicle (vehicle body) 3 includes a traveling device 7. The traveling device 7 is a device including front wheels 7F and rear wheels 7R. The front wheels 7F may be tires or crawlers. The rear wheels 7R may also be tires or crawlers. The motor 4 may be a diesel engine, an electric motor, or another motor. This embodiment includes a diesel engine. The transmission 5 is capable of switching a driving force of the traveling device 7 by shifting gears, as well as of causing the traveling device 7 to switch between forward traveling and backward traveling. The vehicle body 3 is provided with a cabin 9. The cabin 9 is internally provided with a driver's seat 10.

At a rear portion of the vehicle body 3, a coupling unit 8 including a three-point link mechanism, for example, is provided.

The coupling unit 8 can attach and detach a work device 2. When the work device 2 is coupled to the coupling unit 8, the vehicle body 3 can tow the work device 2. The work device 2 may be, for example, a cultivating device, a fertilizer application device, an agricultural chemical application device, a harvesting device, a grass reaping device, a grass distributing device, a grass collecting device, or a grass forming device. FIG. 6 illustrates an example in which a cultivating device is attached as the work device 2.

As illustrated in FIG. 1, the transmission 5 includes a main shaft (propeller shaft) 5a, a main transmission unit 5b, a sub transmission unit 5c, a shuttle unit 5d, a PTO power transmission unit 5e, and a front transmission unit 5f.

The propeller shaft 5a is rotatably supported by a housing case of the transmission 5. The propeller shaft 5a is transmitted with power of the engine 4 via a crank shaft. The main transmission unit 5b includes a shifter configured to select a gear from among a plurality of gears, as well as to change connection of the gear. When the shifter is used to change, as required, connection (engagement) of the plurality of gears, the main transmission unit 5b changes and outputs (increases or decreases) rotations input from the propeller shaft 5a.

Similar to the main transmission unit 5b, the sub transmission unit 5c also includes a shifter configured to select a gear from among a plurality of gears, as well as to change connection of the gear. When the shifter is used to change, as required, connection (engagement) of the plurality of gears, the sub transmission unit 5c changes and outputs (increases or decreases) rotations input from the main transmission unit 5b.

The shuttle unit 5d includes a shuttle shaft 12 and a forward-backward switching unit 13. The shuttle shaft 12 is transmitted with power output from the sub transmission unit 5c via a gear, for example. The forward-backward switching unit 13 includes a hydraulic clutch, for example. When the hydraulic clutch is connected or disconnected, a rotation direction of the shuttle shaft 12, i.e., forward and backward traveling of the tractor 1, is switched. The shuttle shaft 12 is connected to a rear wheel differential device 20R. The rear wheel differential device 20R rotatably supports a rear axle 21R attached with the rear wheels 7R.

The PTO power transmission unit 5e includes a PTO propeller shaft 14 and a PTO clutch 15. The PTO propeller shaft 14 is rotatably supported, and is capable of transmitting power from the propeller shaft 5a. The PTO propeller shaft 14 is connected to a PTO shaft 16 via a gear, for example. The PTO clutch 15 includes a hydraulic clutch, for example. When the hydraulic clutch is connected or disconnected, a state in which power of the propeller shaft 5a is transmitted to the PTO propeller shaft 14 and a state in which power of the propeller shaft 5a is not transmitted to the PTO propeller shaft 14 are switched.

The front transmission unit 5f includes a first clutch 17 and a second clutch 18. The first clutch 17 and the second clutch 18 are each capable of transmitting power from the propeller shaft 5a. For example, power of the shuttle shaft 12 is transmitted via a gear and a transmission shaft. Power from the first clutch 17 and the second clutch 18 can transmit, via a front transmission shaft 22, to a front axle 21F. Specifically, the front transmission shaft 22 is connected to a front wheel differential device 20F. The front wheel differential device 20F rotatably supports the front axle 21F attached with the front wheels 7F.

The first clutch 17 and the second clutch 18 each include a hydraulic clutch, for example. The first clutch 17 is connected with a hydraulic path. The hydraulic path is connected to a first operation valve 31 to be supplied with hydraulic oil supplied from the hydraulic pump. The first clutch 17 switches between a connected state and a disconnected state depending on a degree of opening of the first operation valve 31. The second clutch 18 is connected with a hydraulic path. The hydraulic path is connected to a second operation valve 32. The second clutch 18 switches between a connected state and a disconnected state depending on a degree of opening of the second operation valve 32. The first operation valve 31 and the second operation valve 32 are two-position switching valves each having an electromagnetic valve. The two-position switching valve switches between a connected state and a disconnected state when a solenoid of the electromagnetic valve is magnetized or demagnetized, for example.

When the first clutch 17 is in the disconnected state and the second clutch 18 is in the connected state, power of the shuttle shaft 12 transmits, via the second clutch 18, to the front wheels 7F. Therefore, the front wheels and the rear wheels are driven, i.e., four wheel drive (4WD) is established, by the power respectively at an approximately identical rotation speed (4WD constant velocity state). On the other hand, when the first clutch 17 is in the connected state and the second clutch 18 is in the disconnected state, the four wheel drive is established, but a rotation speed of the front wheels becomes greater than a rotation speed of the rear wheels (4WD acceleration state). When both the first clutch 17 and the second clutch 18 are in the connected state, power of the shuttle shaft 12 is not transmitted to the front wheels 7F, but is transmitted to the rear wheels. The rear wheels are thus driven by the power, establishing two wheel drive (2WD).

As illustrated in FIG. 1, the tractor 1 includes a left brake device 25a and a right brake device 25b. The left brake device 25a and the right brake device 25b are disc brake devices each capable of switching between a braking state and a brake-releasing state. The left brake device 25a is provided to a left side of the rear axle 21R. The right brake device 25b is provided to a right side of the rear axle 21R. For example, a left brake pedal and a right brake pedal are provided around the driver's seat 10. When an operator of the tractor 1 operates (depresses) the left brake pedal, a left coupling member 26a coupled to the left brake pedal moves in a braking direction. As a result, the left brake device 25a can attain the braking state. When the operator operates (depresses) the right brake pedal, a right coupling member 26b coupled to the right brake pedal moves in a braking direction. As a result, the right brake device 25b can attain the braking state.

The left coupling member 26a is coupled with a left hydraulic operation unit 27a configured to operate with hydraulic oil. The left hydraulic operation unit 27a is connected with a third operation valve (left brake valve) 28a via a hydraulic path. When the left hydraulic operation unit 27a is operated, the third operation valve 28a causes the left coupling member 26a to move in the braking direction. The right coupling member 26b is coupled with a right hydraulic operation unit 27b configured to operate with hydraulic oil. The right hydraulic operation unit 27b is connected with a fourth operation valve (right brake valve) 28b via a hydraulic path. When the right hydraulic operation unit 27b is operated, the fourth operation valve 28b causes the right coupling member 26b to move in the braking direction.

As described above, the left brake device 25a and the right brake device 25b can independently brake the left rear wheel 7R and the right rear wheel 7R with not only operations of the left brake pedal and the right brake pedal, but also operations of the left hydraulic operation unit 27a and the right hydraulic operation unit 27b.

As illustrated in FIGS. 1 and 6, the tractor 1 includes a steering device 11. As illustrated in FIG. 1, the steering device 11 includes a handle (steering wheel) 11a, a rotation shaft (steering shaft) 11b, and an auxiliary mechanism (power steering mechanism) lie. The rotation shaft 11b rotates as the handle 11a is rotated. The auxiliary mechanism 11c assists the handle 11a being steered. The auxiliary mechanism lie includes a hydraulic pump 33, a control valve 34, and a steering cylinder 35. The control valve 34 is supplied with hydraulic oil supplied from the hydraulic pump 33. The steering cylinder 35 is operated by the control valve 34. The control valve 34 is an electromagnetic valve configured to operate based on a control signal. The control valve 34 is a three-position switching valve capable of performing switching as a spool moves, for example. The control valve 34 is also capable of performing switching as the steering shaft 11b is steered. The steering cylinder 35 is connected to arms (knuckle arms) 36 configured to change a direction of the front wheels 7F.

Therefore, when the handle 11a is operated, a switching position and a degree of opening of the control valve 34 switch in accordance with the handle 11a. The steering cylinder 35 then extends or contracts toward left or right in accordance with the switching position and the degree of opening of the control valve 34. As a result, a steering direction of the front wheels 7F can be changed. The steering mechanism 11, described above, is merely an example. The embodiment is not limited to the above described configuration.

As illustrated in FIG. 6, the tractor 1 includes a position detector 39. The position detector 39 is attached on a top board of the cabin 9 of the tractor 1. Although the position detector 39 is attached to the top board of the cabin 9, the embodiment is not limited to the attachment location on the tractor 1. The position detector 39 may be attached to another location. The position detector 39 may be attached to the work device 2. The position detector 39 is a position detector configured to detect its own position (positioning information including a latitude and a longitude) by using a satellite positioning system. In other words, the position detector 39 is configured to receive a signal (e.g., position of a positioning satellite, time of transmission, and correction information) sent from the positioning satellite to detect a position (e.g., latitude, longitude) based on the received signal. Therefore, the position detector 39 provided on the tractor 1, for example, allows detection of a position when the tractor 1 is traveling. As illustrated in FIG. 1, a controller 40, described later, can acquire a position (mechanical position) detected by the position detector 39.

As illustrated in FIG. 1, the tractor 1 includes the controller 40. The controller 40 is a device configured to perform travel-related controls and work-related controls in the tractor 1. Specifically, the controller 40 includes a first control module 41, a storage unit 43, and an acquisition module 49. The first control module 41 and the acquisition module 49 respectively include electric and electronic components provided in the controller 40 and programs incorporated in the controller 40, for example. The storage unit 43 is a non-volatile memory, for example.

The first control module 41 is capable of controlling a first control (auto-steering control) in the steering device 11 based on a travel route (scheduled travel route) R.

The auto-steering control refers to a control of setting a switching position and a degree of opening of the control valve 34 so that at least a position of the tractor 1 (position detected by the position detector 39) and the travel route R match each other, i.e., the vehicle body 3 follows the travel route R. In other words, the auto-steering control sets a moving direction and a moving amount of the steering cylinder 35 (steering direction and steering angle of the front wheels 7F) so that a position of the tractor 1 and the travel route R match each other.

The travel route R is set by using a computer, such as a personal computer (PC), a smartphone (multi-function cellular phone), or a tablet. The travel route R may be set by using a device, such as a display device, mounted on the tractor 1.

Figure 2:
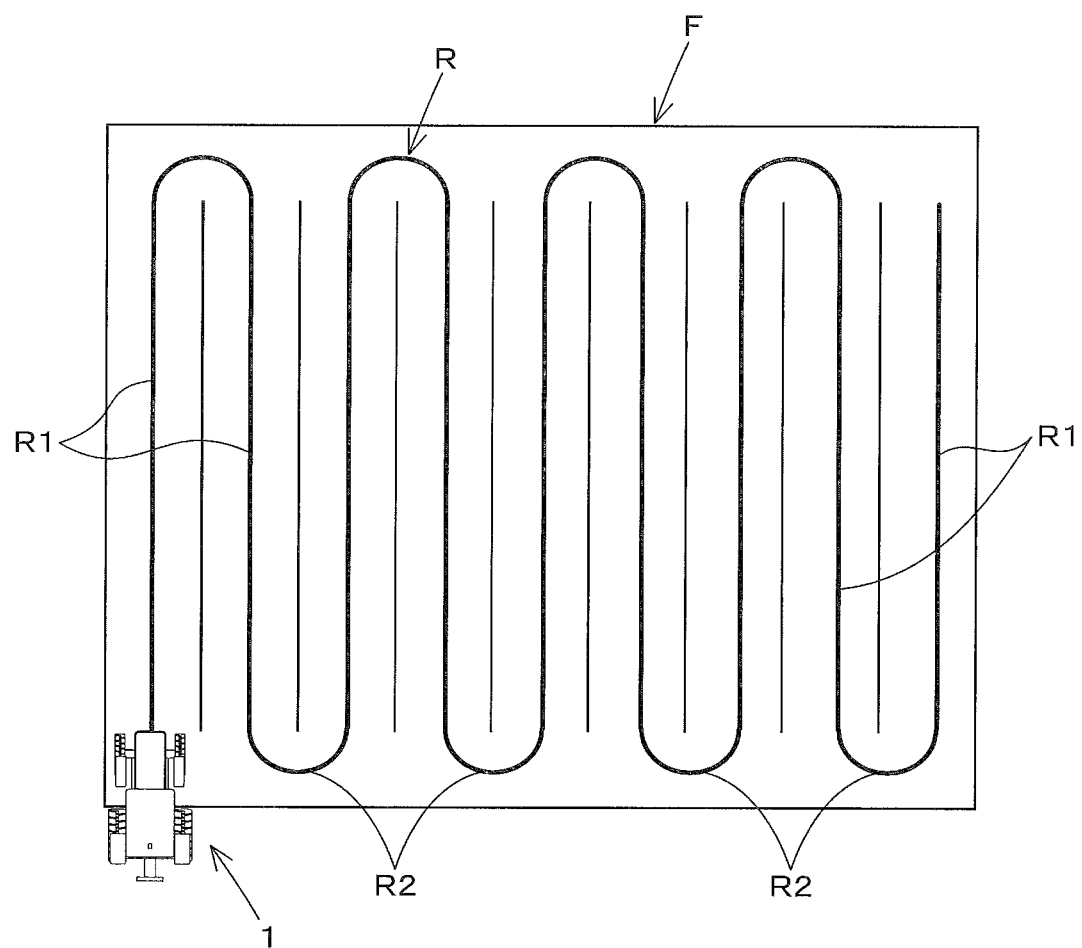
FIG. 2 is a view of an example of a travel route R for a tractor.

FIG. 2 is a view of an example of the travel route R for the tractor. To set the travel route R, as illustrated in FIG. 2, allow a display unit of a computer to show a work site (e.g., field) F in which the tractor 1 works. On the work site F shown on the display unit of the computer, set the travel route R for the tractor 1. For example, an operator or an administrator uses an interface of the computer to set the travel route R on the work site F shown on the display unit of the computer. For example, as the travel route R, set a straight part R1 at which the tractor 1 runs straight ahead and a turning part R2 at which the tractor 1 makes a turn. The straight part R1 and the turning part R2 in the travel route R are associated with a position (latitude and longitude). Determining, on a computer, at least positions corresponding to the straight part R1 and the turning part R2 can set the travel route R. The set travel route R illustrated in FIG. 2 is merely an example. The embodiment is not limited to the settings.

Upon the computer sets the travel route R, connect, to the computer, an electronic storage medium, such as a USB memory or an SD card, to transfer the travel route R set with the computer to the electronic storage medium. Thereafter, connect the electronic storage medium stored with the travel route R to a device, such as the controller 40 or a display device 48, mounted on the tractor 1. The display device 48 is a device having a liquid crystal panel and configured to display various information of the tractor 1, for example.

When the electronic storage medium is connected to a device (controller 40 or display device 48) of the tractor 1, the acquisition module 49 of the controller 40 asks the electronic storage medium for the travel route R. Therefore, the travel route R can be acquired from the electronic storage medium.

The method of inputting the travel route R from a computer to the controller 40 is not limited to the above described example. The tractor 1 may be provided with a wireless communication device to allow the communication device to receive the travel route R sent from the computer, for example. In this case, when the communication device receives the travel route R, the acquisition module 49 asks the communication device for the travel route R. Therefore, the travel route R received from the communication device can be acquired.

As illustrated in FIG. 1, the controller 40 is connected with a switch (instruction switch) 47. The instruction switch 47 (an example of a second switch) is a switch capable of switching between ON and OFF. When switched to ON, the instruction switch 47 enables the auto-steering control. When switched to OFF, the instruction switch 47 disables the auto-steering control. The instruction switch 47 is provided adjacent to the driver's seat 10 so as to be operated by an operator. The instruction switch 47 may be any kind of switch, such as a switch configured to hold ON or OFF and an automatic-return switch configured to turn ON when pushed. A graphic representing the instruction switch 47 may be displayed on the display device 48. In this case, the graphic may be operated to switch the instruction switch 47 between ON and OFF.

When the tractor 1 starts traveling, and when the instruction switch 47 is switched to ON, the first control module 41 executes the auto-steering control. The first control module 41 first compares a position (mechanical position) of the tractor 1, which is detected by the position detector 39, with a position (scheduled travel position) indicated on the travel route R. When the mechanical position and the scheduled travel position match each other, the first control module 41 keeps a steering angle and a steering direction of the handle 11a of the steering device 11 (steering angle and steering direction of the front wheels 7F) unchanged (keeps a degree of opening and a switching position of the control valve 34 unchanged).

On the other hand, when a mechanical position and a scheduled travel position do not match each other, the first control module 41 changes a steering angle and/or a steering direction of the handle 11a of the steering device 11 (changes a degree of opening and/or a switching position of the control valve 34) so that a deviation (differential amount) between the mechanical position and the scheduled travel position becomes zero.

Figure 3A:
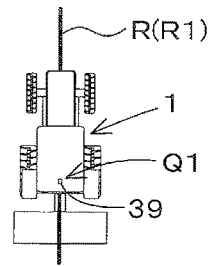
FIG. 3A is a view of the tractor traveling on the travel route R.
Figure 3B:
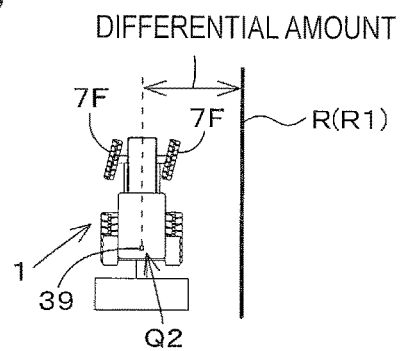
FIG. 3B is a view of the tractor going left from the travel route R.

As illustrated in FIG. 3A, when a deviation between a mechanical position and a scheduled travel position is below a threshold value, and when a mechanical position Q1 of the tractor 1 lies on the straight part R1, for example, the first control module 41 does not change a current value to be output to the control valve 34. As illustrated in FIG. 3B, when a deviation between a mechanical position and a scheduled travel position is equal to or above the threshold value, and when a mechanical position Q2 of the tractor 1 deviates leftward from the straight part R1, the first control module 41 sets a switching position for the control valve 34 so that the handle 11a is steered right, as well as increases a current value to be output to the control valve 34, in accordance with a magnitude of the deviation to set a steering angle.

Figure 3C:
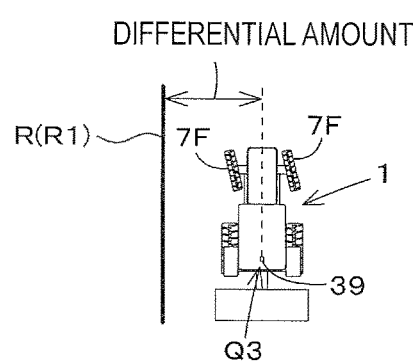
FIG. 3C is a view of the tractor going right from the travel route R.

As illustrated in FIG. 3C, when a mechanical position Q3 of the tractor 1 deviates rightward from the straight part R1, the first control module 41 sets a switching position for the control valve 34 so that the handle 11a is steered left, as well as increases a current value to be output to the control valve 34, in accordance with a magnitude of the deviation to set a steering angle.

Figure 3D:
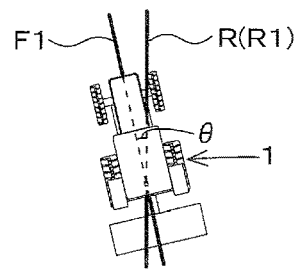
FIG. 3D is a view of the tractor traveling in a direction that differs from a direction of the travel route R.

In the embodiment, described above, a steering angle of the steering device 11 has been changed based on a deviation between a mechanical position and a scheduled travel position. However, when a direction of the travel route R differs from a direction (vehicle body direction) F1 when the tractor 1 (vehicle body 3) is in an advancing direction (travel direction), i.e., as illustrated in FIG. 3D, when an angle θ of the vehicle body direction F1 with respect to the travel route R is equal to or above a threshold value, the first control module 41 may set a steering angle so that the angle θ becomes zero (the vehicle body direction F1 and a direction of the travel route R match each other).

The first control module 41 may set a final steering angle in the auto-steering control based on a steering angle acquired based on a deviation (position deviation) and a steering angle acquired based on a direction (direction deviation). A steering angle set in the auto-steering control, as described in the above embodiment, is merely an example.

As illustrated in FIG. 1, the controller 40 includes a second control module 42. The second control module 42 includes electric and electronic components provided in the controller 40 and programs incorporated in the controller 40, for example. The second control module 42 is configured to perform a control that differs from the control to be performed by the first control module 41. Specifically, the second control module 42 perfoinis a second control on a speed of the traveling device 7 when a steering angle of the handle 11a (steering angle of the front wheels 7F) is equal to or above a threshold value.

The second control includes a control (acceleration control) in which a rotation speed of the front wheels 7F is increased than a rotation speed of the rear wheels 7R (4WD acceleration state). The second control also includes a control (AD control) in which the left rear wheel 7R and the right rear wheel 7R are independently braked.

Specifically, the controller 40 is connected with a steering angle detector 44, a first mode switch 45 (an example of a first switch), and a second mode switch 46 (another example of the first switch). The steering angle detector 44 is a device capable of detecting a steering angle of the steering device 11 (steering angle of the handle 11a) or a steering angle (turning angle) of the front wheels 7F. The first mode switch 45 is a switch capable of switching among a "2WD mode", a "4WD mode", and an "acceleration (double speed) mode". The second mode switch 46 is also a switch capable of switching between ON and OFF. The second mode switch 46 switches to an "AD mode" when switched to ON. The second mode switch 46 cancels the "AD mode" when switched to OFF. Therefore, with a pair of the first mode switch 45 and the second mode switch 46, whether the "AD mode" is added can be set, in addition to the "2WD mode", the "4WD mode", and the "acceleration (double speed) mode".

In a mode (hereinafter referred to as an AD acceleration mode) in which the acceleration mode is set and the AD mode is added, the second control module 42 executes both the acceleration control and the AD control. Specifically, while the tractor 1 is traveling, when a steering angle of the steering device 11, which is detected by the steering angle detector 44, is equal to or above the threshold value, the second control module 42 begins the acceleration control. In the acceleration control, the second control module 42 outputs control signals to the first operation valve 31 and the second operation valve 31 to switch the first clutch 17 into the connected state and the second clutch 18 into the disconnected state. In other words, the second control module 42 executes the acceleration control to increase a rotation speed of the front wheels 7F (an example of a first traveling device) approximately twice a rotation speed of the rear wheels 7R (an example of a second traveling device).

The second control module 42 executes the AD control in addition to the acceleration control. In the AD control, when a steering direction detected by the steering angle detector 44 is a left direction, the second control module 42 outputs a control signal to the left brake valve 28a to allow only the left brake device 25a to attain the braking state, among the left brake device 25a and the right brake device 25b. By allowing the left brake device 25a to attain the braking state, a rotation speed of the left rear wheel 7R can be reduced.

In the AD control, when a steering direction detected by the steering angle detector 44 is a right direction, the second control module 42 outputs a control signal to the right brake valve 28b to allow only the right brake device 25b to attain the braking state, among the left brake device 25a and the right brake device 25b. By allowing the right brake device 25b to attain the braking state, a rotation speed of the right rear wheel 7R can be reduced. One rear wheel out of the left rear wheel 7R and the right rear wheel 7R, which is not braked, is another example of the second traveling device, and another rear wheel which is braked is an example of a third traveling device or another example of the first traveling device.

When the acceleration mode is not added with the AD mode, i.e., in only the acceleration mode, the second control module 42 executes only the acceleration control. Therefore, the left brake valve 28a and the right brake device 25b are kept in the brake-releasing state. When the 2WD mode is set, the second control module 42 outputs control signals to the first operation valve 31 and the second operation valve 31 to allow the first clutch 17 and the second clutch 18 to attain the disconnected state (2WD). When the 4WD mode is set, the second control module 42 allows the first clutch 17 to attain the disconnected state, while allows the second clutch 18 to attain the connected state (4WD constant velocity state).

The first control (auto-steering control) to be performed by the first control module 41 can be prioritized and executed over the second control (acceleration control, AD control) to be performed by the second control module 42. A relationship between the first control module 41 and the second control module 42 (control method for work machine) will now be described herein with reference to FIGS. 4 and 5.

Figure 4:
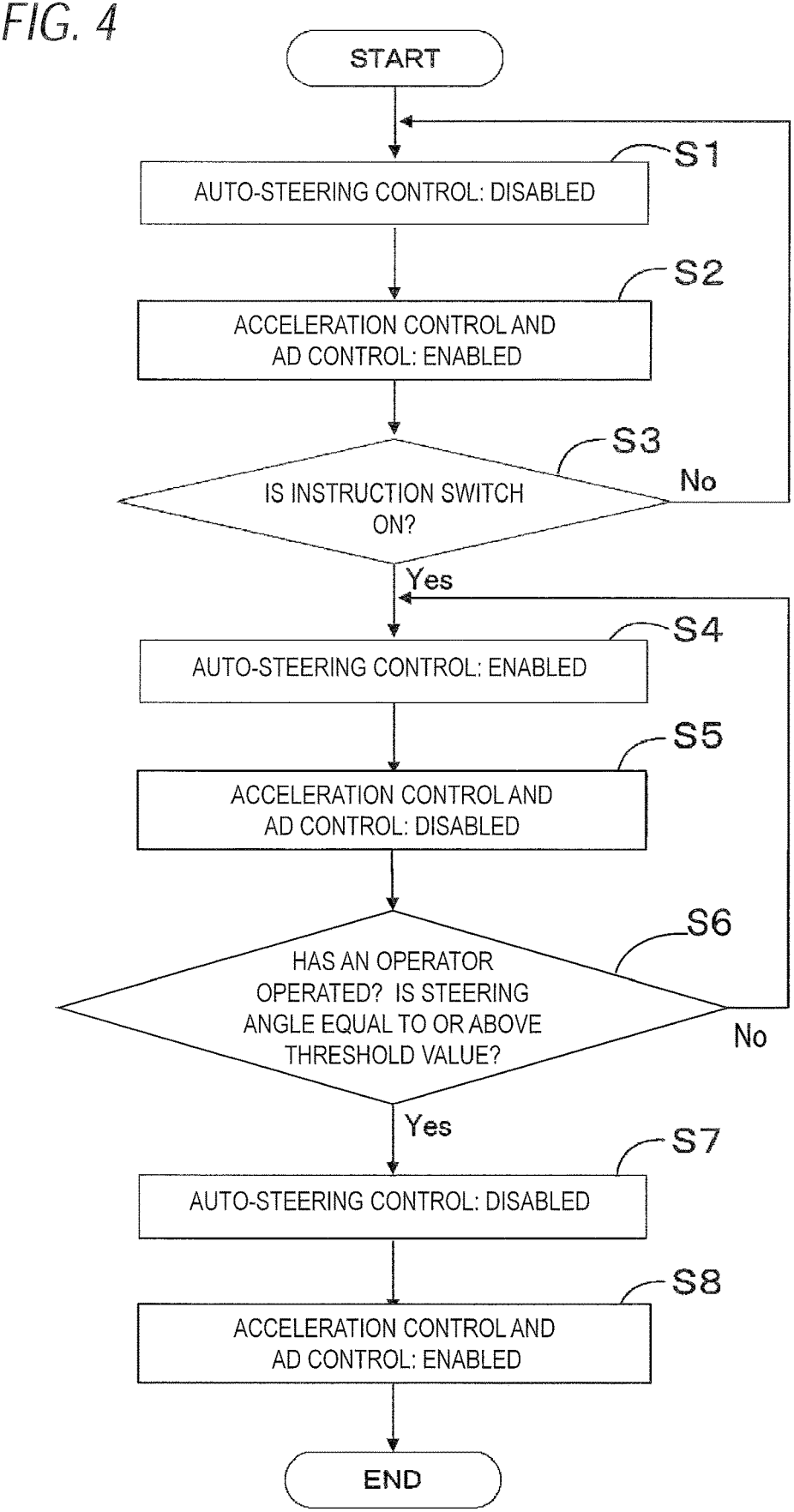
FIG. 4 is a flowchart of an auto-steering control, an acceleration control, and an AD control.

As illustrated in FIG. 4, while the tractor 1 is traveling and the instruction switch 47 is in OFF (auto-steering control is disabled) (S1), the second control (acceleration control, AD control) to be performed by the second control module 42 is enabled and executable (S2). In other words, when an operator switches the first mode switch 45 and the second mode switch 46, for example, the acceleration control, the AD control, and other controls can be executed.

While the tractor 1 is traveling, the controller 40 determines whether the instruction switch 47 is switched to ON (S3). While the instruction switch 47 is kept in OFF (S3, No), the second control (acceleration control, AD control) to be performed by the second control module 42 is enabled. On the other hand, when the instruction switch 47 is switched to ON (S3, Yes), the controller 40 enables the first control (auto-steering control) to be performed by the first control module 41 (S4), and disables the enabled second control (acceleration control, AD control) to be performed by the second control module 42 (S5).

Figure 5:
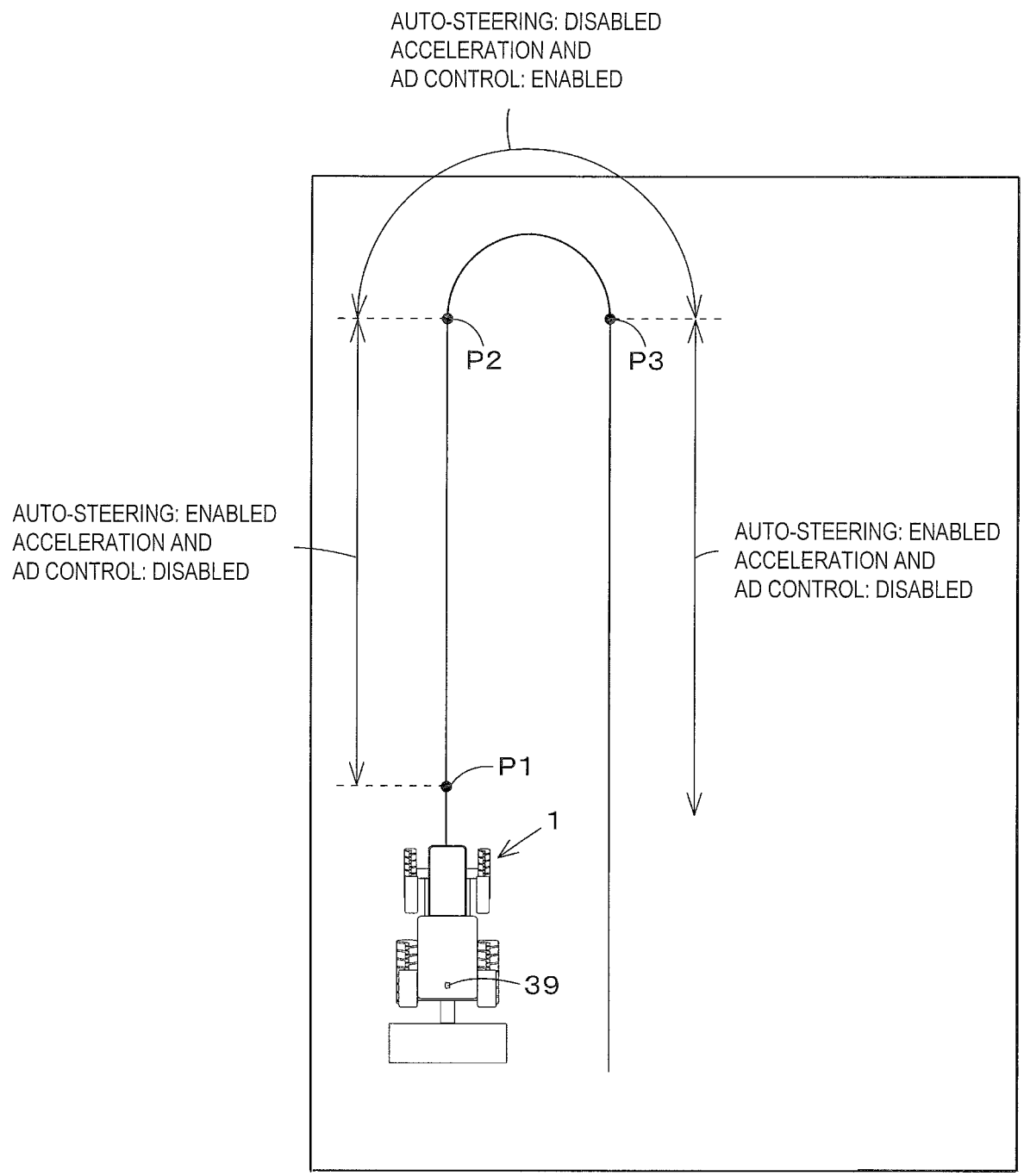
FIG. 5 is a view of the tractor being traveling.

As illustrated in FIG. 5, for example, when the instruction switch 47 is switched from OFF to ON at a position P1, the auto-steering control is enabled, while the acceleration control and the AD control are disabled at the position P1. In other words, at and after the position P1, the first control module 41 prioritizes and executes the auto-steering control over the acceleration control and the AD control to be performed by the second control module 42.

When the auto-steering control is enabled, the controller 40 determines whether the operator has steered the handle 11a, as well as determines whether a steering angle (manual steering angle) at which the operator has steered is equal to or above the threshold value (S6). Whether the operator has steered the handle 11a can be determined with behavior of the handle 11a (steering shaft 11b). For example, whether the operator has steered the handle 11a can be detected by detecting behavior of the handle 11a (steering shaft 11b) through the control valve 34, such as when the spool of the control valve 34 moves in a direction that differs from a direction to which the first control module 41 has controlled the control valve 34 (when the control valve 34 is switched), and when a degree of opening of the control valve 34 is increased or decreased due to resistance, for example, of the handle 11a in accordance with an amount of operation (degree of opening) at which the first control module 41 has operated the control valve 34. A method of detecting whether an operator has steered the handle 11a is not limited to the above described example. Whether an operator has steered the handle 11a may be detected by providing a sensor or by using another method.

When it is not detected if the operator has steered the handle 11a (S6, No), or, even when it is detected that the operator has steered the handle 11a, when a manual steering angle is below the threshold value (S6, No), the controller 40 keeps the auto-steering control. When it is detected that an operator has steered the handle 11a, the enabled auto-steering control may be disabled.

When it is detected that the operator has steered the handle 11a, and a manual steering angle is equal to or above the threshold value (S6, Yes), the controller 40 disables the enabled auto-steering control (S7). In other words, when a steering angle is equal to or above the threshold value, the first control module 41 stops the auto-steering control. When the instruction switch 47 is a holding type switch, for example, the instruction switch 47 switches from ON to OFF upon the controller 40 disables the enabled auto-steering control. The controller 40 enables the disabled second control (acceleration control, AD control) (S8). While the tractor 1 is traveling, the controller 40 repeatedly executes S4 to S8.

As illustrated in FIG. 5, for example, when the operator steers the handle 11a and the tractor 1 starts turning at a position P2, and when a manual steering angle is equal to or above the threshold value, the disabled acceleration control and the disabled AD control are enabled. Therefore, the tractor 1 can be braked and turned at a double speed. After the tractor 1 has made a turn, when the tractor 1 lies at a position P3 and the instruction switch 47 is switched from OFF to ON, the controller 40 enables again the disabled auto-steering control to be performed by the first control module 41, and disables the enabled acceleration control and the enabled AD control performed by the second control module 42.

As described above, the first control module 41 prioritizes and performs the first control (auto-steering control) over the second control (acceleration control, AD control) to be performed by the second control module 42. For example, after the tractor 1 has made a turn and when the tractor 1 runs straight ahead under the auto-steering control, if the tractor 1 deviates from the straight part R1 on the travel route R at a point of time of transition (at a point of time of starting auto-steering), a steering angle of the steering device 11 increases to cause the tractor 1 to revert to the straight part R1. At this time, if the acceleration control and the AD control to be performed by the second control module 42 are still enabled, the acceleration control and the AD control will be executed at a point of time when a steering angle of the steering device 11 is equal to or above the threshold value. This might require more time to cause the tractor 1 to revert to the straight part R1. Otherwise the tractor 1 might behave unstably.

However, in this embodiment, the acceleration control and the AD control to be performed by the second control module 42 are disabled at a point of time of transition (at a point of time of starting auto-steering). Therefore, even if the tractor 1 deviates from the straight part R1 at a point of time of transition, neither the acceleration control nor the AD control will be executed. In other words, after the tractor 1 has made a turn and when the tractor 1 runs straight ahead under the auto-steering control, for example, the tractor 1 can behave stably.

Even when a steering angle of the steering device 11 increases, such as when the tractor 1 is caused to meander under the auto-steering control, the auto-steering control is prioritized over the acceleration control and the AD control. Therefore, the tractor 1 can smoothly travel along the travel route R.

As described above, both the first control (auto-steering control) to be performed by the first control module 41 and the second control (acceleration control, AD control) to be performed by the second control module 42 can operate smoothly.

When an instruction is given by the instruction switch 47, the first control module 41 prioritizes and performs the first control (auto-steering control), in which a steering angle is changed so that the vehicle body 3 follows the travel route R, over the acceleration control to be performed by the second control module 42, in which a rotation speed of the front wheels 7F is increased, or the AD control to be performed by the second control 42, in which either of the rear wheels 7R, which corresponds to a steering direction of the steering device 11, is braked. As described above, an operator can set, with the instruction switch 47, a timing at which the tractor 1 travels under the auto-steering control. When the auto-steering control is selected with the instruction switch 47, neither the acceleration control nor the AD control is executed. Therefore, the tractor 1 can behave stably.

When a steering angle is equal to or above the threshold value, the first control module 41 may stop the first control (auto-steering control). In this case, for example, when the tractor 1 running straight ahead is making a turn, the turning is automatically detected and the auto-steering control is automatically stopped. Therefore, the tractor 1 under the acceleration control and the AD control can smoothly make a turn.

The embodiment disclosed herein is given only for illustration and should not be construed as being restrictive. The scope of the present invention is indicated not by the above description but by the claims, and is intended to include equivalent meanings to the claims and all modifications within the scope.

In the above described embodiment, the first control represents the auto-steering control, while the second control represents the acceleration control and/or the AD control. However, the embodiment is not limited to this. The first control may be at least a control on steering of the steering device, as well as the second control may be at least a control on a speed of the traveling device.

The above described controller for a work machine, the control method for a work machine, and the work machine are applicable in automatic traveling in which the tractor 1 automatically travels along the travel route R. In the automatic traveling, when the tractor 1 running straight ahead is caused to make a turn, for example, the enabled auto-steering control (first control) is automatically disabled, as well as the disabled acceleration control and the disabled AD control (second control) are automatically enabled. In the automatic traveling, when the tractor 1 being turning is caused to run straight ahead, the disabled auto-steering control (first control) is automatically enabled, as well as the enabled acceleration control and the enabled AD control (second control) are automatically disabled. A control method in the automatic traveling is not limited to the above described example.

A controller for a work machine includes a first control module and a second control module. The first control module is configured to perform a first control for a steering device to change a steering angle based on a travel route. The second control module is configured to perform a second control on a speed of a traveling device when the steering angle is equal to or above a threshold value. The first control module prioritizes and performs the first control over the second control to be performed by the second control module.

When the first control module acquires an instruction given by a switch, the first control module prioritizes and performs the first control over the second control.

The first control module changes the steering angle so that a vehicle body follows the travel route. The second control module increases, on the traveling device including front wheels and rear wheels, a rotation speed of the front wheels.

The second control module brakes either of the rear wheels, which corresponds to a steering direction of the steering device.

The first control module stops the first control when the steering angle is equal to or above the threshold value.

A work machine includes a steering device, a traveling device, and a controller. The steering device is configured to change a direction of a vehicle body. The traveling device is provided in the vehicle body. The traveling device includes front wheels and rear wheels. The controller includes a first control module and a second control module. The first control module is configured to perform a first control for the steering device based on a travel route. The second control module is configured to perform a second control on a speed of the traveling device when the steering angle is equal to or above a threshold value. The first control module prioritizes and performs the first control over the second control to be performed by the second control module.

The work machine further includes a switch to be operated by an operator. When the first control module acquires an instruction given by the switch, the first control module prioritizes and performs the first control over the second control.

The first control module changes a steering angle of the steering device so that the vehicle body follows the travel route. The second control module increases a rotation speed of the front wheels.

The second control module brakes a wheel of the rear wheels, which corresponds to a steering direction of the steering device.

The first control module stops the first control when the steering angle is equal to or above the threshold value.

Obviously, numerous modifications and variations of the present invention are possible in light of the above teachings. It is therefore to be understood that within the scope of the appended claims, the invention may be practiced otherwise than as specifically described herein.

What is claimed is:

1. A controller for a work machine, comprising:
a steering control circuit configured to control a steering angle of a steering of the work machine which includes a first traveling device and a second traveling device to move the work machine;
a memory to store a threshold angle;
a speed control circuit configured to control a first speed of the first traveling device and a second speed of the second traveling device; and
a selecting device comprising:
a first switch configured to take an on state or an off state, the speed control circuit being configured to control the work machine to turn when the first switch takes the on state; and a second switch configured to take an on state or an off state, the steering control circuit being configured to control the work machine to turn when the second switch takes the on state regardless of whether the first switch takes the on state or the off state, the speed control circuit being configured to control the work vehicle to turn when the steering angle is equal to or larger than the threshold angle, even if the second switch takes the on state.

2. The controller according to claim 1,
wherein the first traveling device includes front wheels,
wherein the second traveling device includes rear wheels opposite to the front wheels in a forward-backward travel direction of the work machine, and
wherein the speed control circuit is configured to increase a first rotation speed of the front wheels of the work machine such that the first rotation speed is larger than a second rotation speed of the rear wheels.

3. The controller according to claim 1,
wherein the first traveling device includes a first rear wheel,
wherein the second traveling device includes a second rear wheel opposite to the first rear wheel in a lateral direction of the work machine, the lateral direction being perpendicular to a forward-backward travel direction of the work machine, and
wherein the speed control circuit is configured to brake the first rear wheel such that a third rotation speed of the first rear wheel is smaller than a fourth rotation speed of the second rear wheel, the first rear wheel corresponding to a turning direction to which the work machine is to turn.

4. The controller according to claim 1,
wherein the steering control circuit stops controlling the steering when the steering angle is equal to or larger than the threshold angle.

5. A work machine comprising:
a vehicle body;
a steering configured to control a steering direction of the vehicle body;
a first traveling device rotatably supported by the vehicle body;
a second traveling device rotatably supported by the vehicle body;
a steering control circuit configured to control a steering angle of the steering;
a memory to store a threshold angle;
a speed control circuit configured to control a first speed of the first traveling device and a second speed of the second traveling device; and
a selecting device including:
    a first switch configured to take an on state or an off state, the speed control circuit being configured to control the work machine to turn when the first switch takes the on state; and
    a second switch configured to take an on state or an off state, the steering control circuit being configured to control the work machine to turn when the second switch takes the on state regardless of whether the first switch takes the on state or the off state, the speed control circuit being configured to control the work vehicle to turn when the steering angle is equal to or larger than the threshold angle, even if the second switch takes the on state.

6. The work machine according to claim 5,
wherein the first traveling device includes front wheels,
wherein the second traveling device includes rear wheels opposite to the front wheels in a forward-backward travel direction of the work machine, and
wherein the speed control circuit is configured to increase a first rotation speed of the front wheels such that the first rotation speed is larger than a second rotation speed of the rear wheels.

7. The work machine according to claim 5,
wherein the first traveling device includes a first rear wheel,
wherein the second traveling device includes a second rear wheel opposite to the first rear wheel in a lateral direction of the work machine, the lateral direction being perpendicular to a forward-backward travel direction of the work machine, and
wherein the speed control circuit is configured to brake the first rear wheel such that a third rotation speed of the first rear wheel is smaller than a fourth rotation speed of the second rear wheel, the first rear wheel corresponding to a turning direction to which the work machine is to turn.

8. The work machine according to claim 5,
wherein the steering control circuit stops controlling the steering when the steering angle is equal to or larger than the threshold angle.

9. A control method for a work machine, comprising:
controlling a steering angle of a steering of the work machine when a steering control is selected, the work machine including a first traveling device and a second traveling device to move the work machine;
controlling a first speed of the first traveling device and a second speed of the second traveling device when a speed control is selected;
storing a threshold angle in a memory;
selecting the speed control when a first switch takes an on state;
selecting the steering control when a second switch takes an on state regardless of whether the first switch takes the on state or an off state; and
controlling the first speed of the first traveling device and the second speed of the second traveling device when the steering angle is equal to larger than the threshold angle, even if the second switch takes the on state.

10. The controller according to claim 1,
wherein the speed control circuit is configured to further control a third speed of a third traveling device of the work machine,
wherein the first traveling device includes front wheels,
wherein the second traveling device includes a second rear wheel opposite to one of the front wheels in a forward-backward travel direction of the work machine,
wherein the third traveling device includes a first rear wheel opposite to another of the front wheels in the forward-backward travel direction and opposite to the second rear wheel in a lateral direction perpendicular to a forward-backward travel direction,
wherein the speed control circuit is configured to increase a first rotation speed of the front wheels such that the first rotation speed is larger than a second rotation speed of the second rear wheel and to brake the first rear wheel such that a third rotation speed of the first rear wheel is smaller than the second rotation speed of the second rear wheel, the first rear wheel corresponding to a turning direction to which the work machine is to turn.

11. The work machine according to claim 5, wherein the speed control circuit is configured to further control a third speed of a third traveling device of the work machine, wherein the first traveling device includes front wheels, wherein the second traveling device includes a second rear wheel opposite to one of the front wheels in a forward-backward travel direction of the work machine, wherein the third traveling device includes a first rear wheel opposite to another of the front wheels in the forward-backward travel direction and opposite to the second rear wheel in a lateral direction perpendicular to a forward-backward travel direction, wherein the speed control circuit is configured to increase a first rotation speed of the front wheels such that the first rotation speed is larger than a second rotation speed of the second rear wheel and to brake the first rear wheel such that a third rotation speed of the first rear wheel is smaller than the second rotation speed of the second rear wheel, the first rear wheel corresponding to a turning direction to which the work machine is to turn.

12. The controller according to claim 1, wherein the steering angle is an angle made by a forward travel direction of the work machine and a traveling device direction of the first traveling device, the traveling device direction being substantially perpendicular to an rotational axis of the first traveling device as viewed in a height direction along a height of the work machine.

13. The work machine according to claim 5, wherein the steering direction is substantially perpendicular to an rotational axis of the first traveling device as viewed in a height direction along a height of the work machine.

14. The control method according to claim 9 wherein the steering angle is an angle made by a forward travel direction of the work machine and a traveling device direction of the first traveling device, the traveling device direction being substantially perpendicular to an rotational axis of the first traveling device as viewed in a height direction along a height of the work machine.

* * * * *